United States Patent [19]

Staschke

[11] Patent Number: 4,895,130

[45] Date of Patent: Jan. 23, 1990

[54] BARBECUE LID POSITIONER

[76] Inventor: Marvin A. Staschke, 441 W. Leadora, Glendora, Calif. 91740

[21] Appl. No.: 358,133

[22] Filed: May 30, 1989

[51] Int. Cl.⁴ .................................................. F24B 3/00
[52] U.S. Cl. ................................ 126/25 R; 126/25 A; 126/41 R; 292/338; 248/354.6
[58] Field of Search .................. 126/25 R, 9 R, 25 A, 126/4 B, 25 AA, 39 R, 41 R, 538; 292/338, 288, 339; 248/354.6; 220/85 CH

[56] References Cited

U.S. PATENT DOCUMENTS

| | | | |
|---|---|---|---|
| 1,249,073 | 12/1917 | Halata | 126/25 R |
| 1,415,522 | 5/1922 | Cain | 126/538 |
| 1,482,086 | 1/1924 | Mayworm | 248/354.6 |
| 1,629,012 | 5/1927 | Timble | 126/538 |
| 2,486,132 | 10/1949 | Edvinsson | 248/354.6 |
| 2,520,578 | 8/1950 | Treloar | 126/25 R |
| 2,792,773 | 5/1957 | Barker | 126/25 R |
| 3,088,393 | 5/1963 | Huckabee | 99/259 |
| 3,834,745 | 9/1974 | Coates | 126/9 B |
| 3,940,181 | 2/1976 | Cheek, Jr. | 292/338 |
| 4,192,283 | 3/1980 | Kridler | 126/25 AA |
| 4,476,849 | 10/1984 | Schmidt | 126/25 R |
| 4,584,984 | 4/1986 | Croft | 126/25 R |
| 4,688,543 | 8/1987 | Kopke | 126/29 |
| 4,759,338 | 7/1988 | Croft | 126/25 A |

Primary Examiner—James C. Yeung
Attorney, Agent, or Firm—Kyle W. Rost

[57] ABSTRACT

The lid of a barbecue grill is supported in selected open angles by a positioner arm having notches with acutely angled bumper walls for being struck by the lid when it is raised to push away the arm. The arm has a lower end that bears directly on the barbecue base or is retained by a pivoted clip, with bearing contact through the clip to avoid weighting the pivot point.

5 Claims, 1 Drawing Sheet

U.S. Patent　　　　　Jan. 23, 1990　　　　　4,895,130
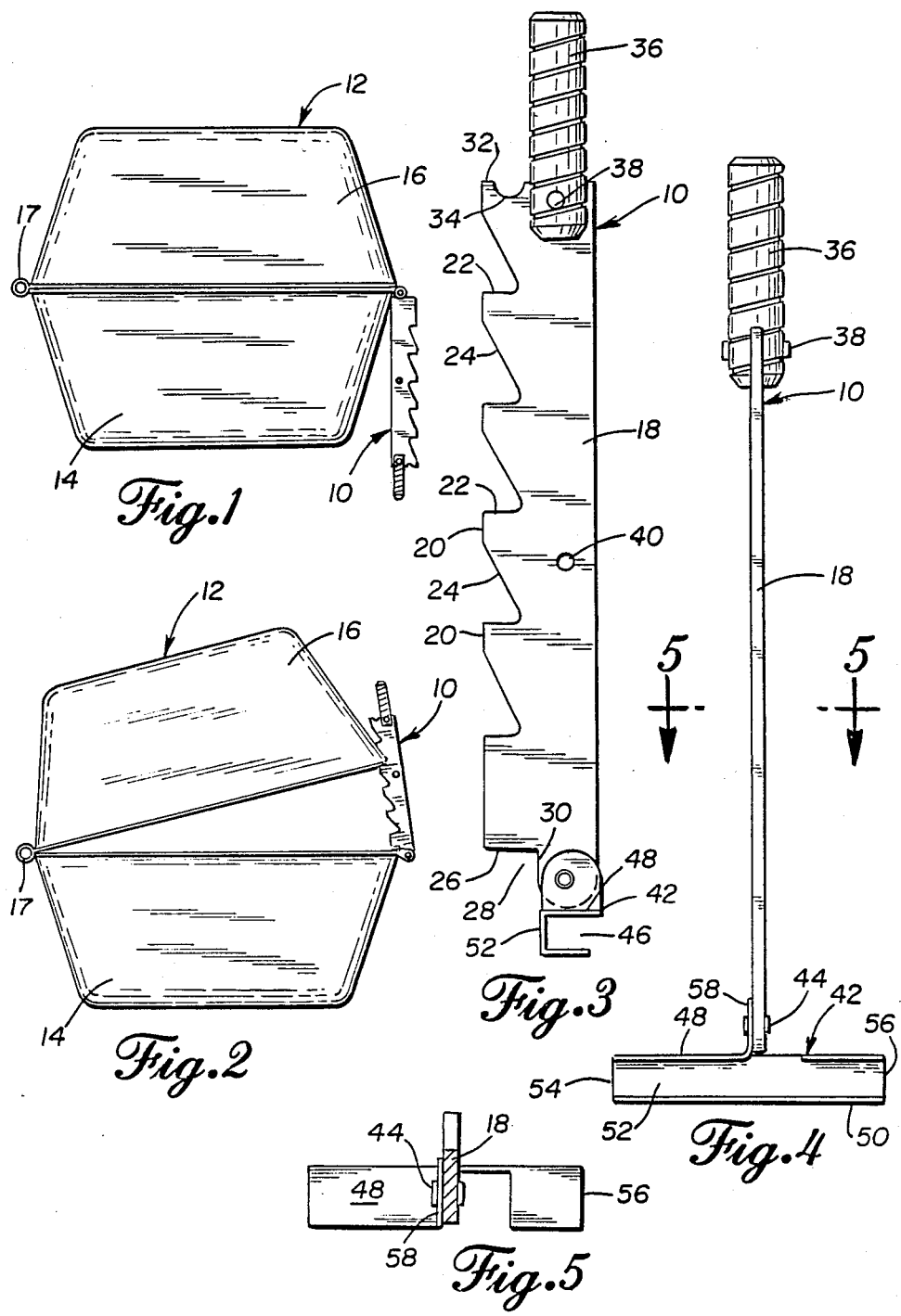

BARBECUE LID POSITIONER

BACKGROUND OF THE INVENTION

1. Field of the Invention

The invention generally relates to stoves and furnaces, especially to summer stoves, and still more specifically to rotating and elevating device for the lids of such summer stoves.

2. Description of the Related Art

Outdoor stoves or barbecues frequently are provided with a lid, which may be used to control cooking conditions. When the lid is removed, the food on the grill is easily accessed, but heat and smoke can escape from the stove quite readily. When the lid is closed, heat and smoke are confined in the area of the food. While some grills are fired by gas, others are fired by charcoal. The relative open or closed position of the lid can be used to regulate the burning intensity of a charcoal fire. In addition, a fully closed or partially closed lid can decrease the oxygen level in the stove to extinguish fat-fueled fires. Thus, the lid is important as a cooking aid and fire regulator when properly used with outdoor stoves.

While some stoves do not accommodate a lid, many have a lid that is limited to only two positions: in the case of pivoted lids, open or closed; and in the case of removeable lids, on or off. It would be desirable to have a supplemental means of holding such lids in one or more intermediate positions, partially open.

Other stoves have associated mechanisms for holding the lid at a desired height above the grill. However, these mechanisms can be difficult to use and unreliable. It would be desirable to have a device that can be used with ease and that performs its job within the ready view of its user. Also, it would be desirable to have a lid controller that does not rely on a weak attachment to the stove body, so that such a controller will not fail under wear and tear by weather and extensive use.

Lid positioning mechanisms can interfere with access to the grill and can operate when not desired to do so. Thus, it would be desirable to have a positioning mechanism that automatically is removed from operation when the lid is opened and that can be removed entirely from the stove, without the use of tools.

A number of devices are known in the art and demonstrate the attempts made to produce an adequate lid positioner. U.S. Pat. No. 4,476,849 to Schmidt, for example, discloses a lid positioning device that is formed from a metal arm with a series of legs spaced along its length. The arm is pivotally bolted to the base of the stove, and it is pivotable from a horizontal, unused position, to a vertical, operational position. The lid can be set on any of the legs to hold the lid at any degree of openness. This type of device requires mechanical modification to the stove base by drilling a hole for the mounting pivot. In addition, the weight of the lid rests on the pivot, which can degrade performance over time. Still another problem is that this device must be manually moved out of operation, which can be difficult while simultaneously handling food and cooking utensils. Similarly, the device is in a fixed position, which may be inconvenient.

U.S. Pat. No. 4,584,984 to Croft discloses a cover positioner that is formed from a metal plate. Upwardly facing, lid supporting hooks are cut or punched from the plane of the plate, as is a lower hook that fits over the edge of the stove base. Thus, the hooks all are integral with body of the metal plate. This positioner is fastened to the stove only by the hooks and requires a separate handle for its manipulation.

U.S. Pat. No. 4,192,283 to Kridler et al. discloses a cover positioner in the form an a metal rod that is pivotally hung from the lid. The depending end of the rod may be engaged in any of several slots in the stove base. Such a positioner is useable only with stoves especially adapted for this device, or by considerable mechanical modification to other stoves. In addition, the rod may tend to dangle under gravity and tend to engage by accident when the lid is being closed. Further, this rod supports the weight of the lid on its pivot and, thus, may fail or become bent with extended use.

U.S. Pat. No. 3,088,393 to Huckabee discloses a stove in which the lid carries several stepped legs that depend on the outside of the stove base. Brackets on the outside of the base receive the legs at a selected step to hold the lid at the desired height. This type of positioner is similar to that of Kridler, in that the stove must be mechanically adapted to be used with this positioner. Further, the positioner is fixed in its location, which may be inconvenient.

U.S. Pat. No. 2,792,773 to Barker discloses a pivoted lid with a sliding prop bar as a positioner. The bar slides through a clamp, which is tightened by a wing nut. This type of positioner appears to be for limited use, as the wing nut and entire positioning mechanism would tend to be hot and possibly unreliable. As in with other positioners, the bar is mechanically mounted to the lid by a pivot, which bears the weight of the lid and may be prone to failure.

U.S. Pat. No. 2,520,578 to Treloar discloses a barbecue over in which a draft regulating closure is positioned by a sliding link passing through a keeper on the side wall of the oven. The link includes several notches that can be set on the keeper. This device requires mechanical mounting of the link and keeper on the oven. In addition, the link is mounted to the draft door by a pivot, which bears the weight of that door.

Finally, U.S. Pat. No. 1,249,073 to Halata discloses a meat smoker in which a lid is suspended over the base on a telescoping pipe. A set screw allows the height of the lid to be fixed by locking together the telescoping pipes. As before, this mechanism requires mechanical attachment to the stove. Further, reliance on a set screw to hold the lid in place is backward and may lead to failure.

The related art that has been discussed leaves unresolved the need for a simple, inexpensive, reliable, and easily used lid positioner, especially one that is readily removed from use and from the stove if desired, automatically moved out of the way when the lid is opened, but, while in use is stable and not subject to falling off the stove and becoming lost.

To achieve the foregoing and other objects and in accordance with the purpose of the present invention, as embodied and broadly described herein, the barbecue lid positioner of this invention may comprise the following.

SUMMARY OF THE INVENTION

Against the described background, it is therefore a general object of the invention to provide an improved barbecue lid positioner in which the positioner is adaptable to substantially any barbecue grill without requiring permanent attachment or mechanical modification of the grill.

Another object is to provide a lid positioner and support that automatically moves out of the way when the barbecue lid is raised.

A further object is to provide a lid support that, on one hand, is capable of pivoting for adjustability, and, on the other hand, does not require that the pivot point bear the full weight of the barbecue lid.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a barbecue lid positioner is adapted for use with a barbecue grill of the type having a stove base and a lid. The positioner includes an elongated arm having a forward side edge that forms a plurality of notches, each having a transversely extending bearing surface for carrying the lower edge of a barbecue lid. The notches also have an upwardly angled back wall surface that is struck by the lid whenever the lid is raised, thereby pushing the lid positioner away from the lid. The arm has a first end edge facing substantially longitudinally oppositely from the bearing surfaces of the shelves, and this first end edge defines a bearing surface for being carried upon an upper edge of the stove base.

According to a further aspect of the invention, the arm may be attached to a stove base by a hooked member, which permits the arm to automatically pivot out of the way when the barbecue lid is raised. The hooked member may be a channel that provides lateral stability to the arm. At the same time, the channel fits within a recess of the arm and is in surface-to-surface abutment with the arm when the arm is in position to support the weight of the barbecue lid. Thus, the pivot point between the arm and channel is freed from bearing the entire weight of the lid.

The arm may be notched at its top end to provide a top step for receiving the barbecue lid. A handle may be attached to the arm at the rear edge of the top notch so as to provide a backstop to that notch. The use of backstop walls on the notches causes the act of lifting the barbecue lid to automatically push away the lid positioner, causing the lid positioner to pivot and fall into a depending position from the channel.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 1 is a side elevational view of the lid positioner attached to a barbecue stove, showing the lid in closed position and the lid positioner in withdrawn configuration.

FIG. 2 is a view similar to FIG. 1, showing the stove lid in partially open position and the lid positioner in operative position.

FIG. 3 is an enlarged, side elevational view of the lid positioner.

FIG. 4 is a rear view thereof, taken from the right side of FIG. 3.

FIG. 5 is a cross-sectional view taken along the plane of line 5—5 of FIG. 4.

DESCRIPTION OF THE PREFERRED EMBODIMENTS

With reference to the drawings and, in particular, to FIGS. 1 and 2, the invention is a barbecue lid positioner 10 that is a free-standing or independently functioning element that may be used in combination with substantially any barbecue grill. In a typical barbecue grill 12 as shown in these drawing figures, the grill has a conventional fire bed or stove base 14. A lid 16 fits over the stove base and may be free-fitting or pivoted, as at hinge 17, to an edge of the base. A free-fitting lid generally can be propped open from any edge, while a pivoted lid opens from one side, which may be referred to as the front. The lid positioner 10 may be temporarily attached to the stove base at any point, which provides a useful degree of freedom. Particularly with a pivoted lid, the positioner 10 can be placed either at any selected point along the front edge as shown in the drawings, or along a side edge. Thus, the user is given freedom to place the positioner 10 where it is out of the way, and to entirely remove the positioner, if desired.

The preferred construction of the lid positioner 10 is shown in FIG. 3, in which the lid positioner is in vertical or operational position. From this orientation, the positioner may be described as having a vertically elongated arm 18, which may be formed of a metal plate. A typical arm 18 is formed of extruded aluminum having general dimensions of about six inches in vertical length; one inch in front-to-rear width, with the front or forward side edge being toward the left in FIG. 3; and about one-eighth inch in thickness, best shown in FIG. 4.

The elongated arm 18 has a forward side edge 20, which faces the barbecue grill when in use. This edge carries a plurality of shelves or bearing surfaces 22. These shelves may be formed as notches extending into the narrow, forward side edge, in which case the notches also have a bumper wall 24 at the inner end of each notch. Other types of bosses or lugs could be used, although the integral notches are preferred as providing an economical and durable structure. The surfaces 22 are transverse to a longitudinal axis of the arm 18, and each has defines a bearing surface that is capable of carrying the lower edge of a barbecue lid, as shown in FIG. 2. The backstop or bumper walls 24 are at an acute angle, such as sixty degrees, to the bearing walls 22. The walls 22 may be approximately three-eights of an inch in length, while the bumper walls 24 may be approximately three-fourths of an inch in length. The bumper walls are designed to be struck by the lid 16 when it is raised from resting in any notch 22, pushing the arm 18 rearwardly.

In addition, the arm 18 has a first or end edge 26, for example the lower end edge in FIGS. 3 and 4. This edge 26 faces substantially longitudinally oppositely from the bearing surfaces 22 of the notches. The lower end edge 26 is a bearing surface, adapted to be carried upon an upper edge of the stove base, when the lid positioner is in operational position. Thus, the lower end edge may define a notch or recess 28 that is capable of receiving such an edge of the stove base. A further, longitudinally extending portion 30 of the arm 18 may define a bumper wall to assist in securing the lower end edge 26 to the barbecue base.

The arm 18 also has a second or upper end edge 32 opposite from lower end edge 26. This second end edge may define a notch 34 having a bearing surface that is capable of receiving and carrying the lower lip of a barbecue lid 16. Thus, the upper end edge serves as the top step of the series of notches 22.

The lid positioner 10 may be provided with a handle 36 that is formed of a material that conducts heat poorly, such as wood. The handle may be joined to arm 18 at any desired point. A rivet 38 may be passed through the handle and through a laterally extending hole in the arm, such as through hole 40 near the center of the arm's length, which would produce a laterally and rearwardly extending handle according to FIG. 3. Another, preferred attachment point is near the upper end edge 32, as the handle is shown in the drawings. With the latter attachment, the handle extends longitudinally from the second end edge. The notch 34 is relatively closer to the front edge 20 of arm 18, and the handle is offset rearwardly from the notch. In this position, the handle is relatively further than the notch 34 from the arm's forward side edge 20 and is capable of serving as a backstop or bumper wall when notch 34 is used to rest the lid 16.

A further element of the lid positioner 10 is hooked member 42, which is adapted to receive an upper edge of a stove base 14. The hooked member 42 and the arm 18 are connected by a hinge or pivot pin 44, thus forming a pivoted connection on a common pivot axis. The pin 44, which may be a rivet, passes through the thickness of the metal plate defining arm 18, such that the axis of this rivet is transverse to a longitudinal axis of the arm 18. Further, the pivot axis is approximately parallel to the forward side edge 20, such that the arm 18 is pivotable with respect to the member 42 in the front-to-rear plane, transversely to a received edge of the stove base. This pivotal motion is shown by a comparison of the arm positions in FIGS. 1 and 2.

The hooked member 42 is best shown in FIGS. 3-5 to be formed of a channel having an open face 46, a pair of opposite side walls 48 and 50, a base wall 52, and a pair of substantially open channel ends 54 and 56. The pivoted connection between the hooked member 42 and arm 18 is juxtaposed to one of the channel side walls, such as wall 48. This connection may be formed of a tab 58 cut from wall 48, bent normally to the wall, and pierced by the rivet 44.

When the lower end 26 of the arm 18 is formed as shown in the drawings, the longitudinally extended portion 30 is offset rearwardly of the longitudinally recessed portion 26. The extended portion 30 may be placed parallel to and overlapping tab 58 in order to define the pivoted connected or hinge between the hooked member 42 and arm 18. This extended portion 30 thus carries the hooked member 42 for pivoted movement both into and out of the recess 28.

The operation of the hooked member or channel 42 is shown in FIGS. 1 and 2, in which the channel is engaged over an edge of the stove base 14. The channel serves as a temporary, easily removed attachment between the barbecue and the lid positioner. When the channel engages an upper edge of a stove base 14, the arm 18 is pivotable with respect to the channel between a relatively depending position as shown in FIG. 1, and a vertically raised position as shown in FIG. 2. In the depending position, the channel 42 is outside the recess 28. In the raised, operational position, the channel 42 is received in the recessed notch 28.

In the latter situation, the weight of the lid is borne by the lid positioner. It is desirable that the rivet 44 should not carry the weight of the lid while the positioner is operating. This goal is achieved because, in the position of FIG. 2, the bottom bearing surface 26 is pressed against the channel's base wall 52, which is resting against the lip of the base 14. Accordingly, the rivet 44 is not carrying the weight of the lid. Instead, the channel 42 merely assists in maintaining the lower end 26 against slipping.

As a further aspect of the invention, the lid positioner 10 automatically pivots out of the way, into the position of FIG. 1, whenever the barbecue lid 16 is raised. This result is caused by the design of the notches 22. Whenever the lid 16 is engaged in any selected one of the notches 22, the act of raising the lid will cause the lid to strike an acutely angled bumper wall 24. This striking action pushes the arm 18 to the rear, causing the arm to pivot and fall into lowered position of FIG. 1. The arm may be raised by handle 36 to restore it to operational position whenever the lid is lowered.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

I claim:

1. A barbecue lid positioner adapted for use with a barbecue grill of the type having a stove base and a lid, comprising:
    an elongated arm having a forward side edge having defined therein a plurality of notches, each having a transversely extending bearing surface for carrying, in use, the lower edge of a barbecue lid, and each notch including an upwardly angled back wall surface for, in use, being struck by the lower edge of a barbecue lid when such lid is raised, pushing the arm rearwardly; and
    said arm having a first end edge facing substantially longitudinally oppositely from said bearing surfaces of the shelves, said first end edge defining a bearing surface for, in use, being carried upon an upper edge of the stove base.

2. The barbecue lid positioner of claim 1, further comprising:
    a hooked member adapted to receive, in use, an upper edge of a stove base;
    said hooked member and said arm having a pivoted connection on a common pivot axis that is transverse to a longitudinal axis of said elongated arm and approximately parallel to said forward side edge thereof, such that, in use, when the hooked member receives an upper edge of a stove base, the arm is pivotable with respect to the hooked member, transversely to the received edge of the stove base.

3. The barbecue lid positioner of claim 2, wherein:

said hooked member comprises a channel having an open face, a pair of opposite side walls, a base wall, and a pair of substantially open channel ends;

the pivoted connection between the hooked member and arm is juxtaposed to one of said channel side walls; and said first end edge of the arm has a longitudinally extended portion and a longitudinally recessed portion, said extended portion including the pivoted connected to the hooked member and carrying the hooked member for pivoted movement both into and out of said recessed portion, such that when, in use, the hooked member engages an upper edge of a stove base, the arm is pivotable with respect thereto between a depending position in which the hooked member is outside the recessed portion, and a vertically raised position in which the hooked member is received in the recessed portion, abutting the first end edge of the arm.

4. The barbecue lid positioner of claim 1, wherein:

said arm has a second end edge opposite from said first end edge; and said second end edge defines a notch therein for carrying, in use, the lower end edge of a barbecue lid.

5. The barbecue lid positioner of claim 4, further comprising:

a handle joined to said arm near said second end edge thereof and extending longitudinally from the second end edge;

wherein said notch is relatively closer to the forward side edge of the arm and the handle is relatively further from the forward side edge, such that the handle serves as a backstop when, in use, a lower end edge of a barbecue lid is received in the notch.

* * * * *